3,541,171
AUTOXIDATION INHIBITION WITH CHLOROPHENOLS
William H. Starnes, Jr., and Henry J. Tarski, Baytown, Tex., assignors to Esso Research and Engineering Company
No Drawing. Filed July 1, 1968, Ser. No. 741,319
Int. Cl. B01j 1/16; C07c 7/18; C10g 9/16
U.S. Cl. 260—666.5                          4 Claims

ABSTRACT OF THE DISCLOSURE

The metal catalyzed autoxidation of organic substrates is inhibited by phenols having one or more atoms of chlorine in the positions ortho and/or para to the hydroxyl group. These chlorophenols function both as free radical chain stoppers and as metal scavenging agents.

BACKGROUND OF THE INVENTION

During manufacture, storage, or end-use applications, many organic products become contaminated with metal ions. Many metal ions are catalysts for autoxidation. Heretofore the metal catalyzed autoxidation has ordinarily been prevented by the addtion of a combination of inhibitors such as chelating agents (as metal scavengers), hindered phenols (as free radical chain stoppers), trivalent phosphorus compounds (as peroxide decomposers), and the like.

Specific chlorinated phenols have been disclosed in the prior art as antioxidants. Illustrative patents are: U.S. 1,788,860; U.S. 2,469,469; and U.S. 2,560,044.

The present invention is directed to the finding that the chlorophenols function in two different ways:

(1) as free radical chain stoppers, and
(2) as precursors to chlorocyclohexadienones which act as metal scavenging agents.

Thus, according to the present invention, a single chlorophenol inhibitor may be used for extraordinarily efficient autoxidation inhibition in an organic substrate containing metal ions.

SUMMARY OF THE INVENTION

The present invention may be briefly described as an organic substrate which is contaminated with metal ions, inhibited by a chlorophenol having one or more chlorine atoms in the positions ortho and/or para to the hydroxyl group. More particularly, the present invention is directed to the inhibition of the metal catalyzed autoxidation of organic hydrocarbons by the stoichiometric addition of a chlorophenol in an amount at least equal to the amount of metal present in the hydrocarbon.

DESCRIPTION OF THE PREFERRED EMBODIMENTS

Organic substrates, both liquid and solid, may become contaminated with metal ions which catalyze autoxidation. Metals such as titanium, vanadium, chromium, manganese, iron, cobalt, nickel, copper, molybdenum, tungsten and lead act as catalysts in the autoxidation of organic substrates. In the storage of liquid organic materials such as aromatic or olefinic hydrocarbons, the metal ion is most likely to come from the metallic storage vessel. Occasionally the metal ion is present due to its introduction during processing or to the use of the metal as a catalyst. In most instances the metal is present as a metal compound in the substrate. The polyolefin polymers produced using a Ziegler polymerization catalyst in a manner well known to the art are examples of solid hydrocarbons contaminated with metal ions. Thus. solid hydrocarbon substrates may be suitably exemplified by polyethylene, polypropylene, polybutene-1, ethylene-propylene copolymers and the like, which are solid polymers having molecular weights in the range from about 10,000 to 1,000,000 or more.

The chlorophenols which are useful in the present invention have one or more atoms of chlorine in the positions ortho and/or para to the hydroxyl group. A preferred chlorophenol is a hindered phenol which is defined as one having either an alkyl or a chloro group in both ortho positions. The chlorophenols may be suitably exemplified by 2 - chloro - 4 - methyl - 6 - t - butylphenol; 2,6 - di-t-butyl - 4 - chlorophenol; 2,6 - dimethyl-4-chlorophenol; 3-methyl - 4 - chloro-6-t-butylphenol; and 2,3,4,5,6-pentachlorophenol.

The hindered chlorophenol of the present invention may be illustrated by the following formula:

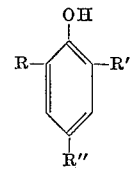

where:

R and R' are a $C_1$ to $C_8$ alkyl or chloro group
R" is hydrogen, a $C_1$ to $C_8$ alkyl or chloro group and at least one of the groups R' or R" is a chloro group.

The chlorophenols of the present invention are present in the organic substrates in an amount at least equal stoichiometrically to the amount of metal present. The chlorophenol in the organic substrate is converted under oxidizing conditions to a free phenoxy radical which can then react with any other radical produced in the substrate to form a chlorocyclohexadienone. The chlorocyclohexadienone reacts with the metal present, converting it to a catalytically inactive metallic chloride. Thus, under oxidizing conditions the chlorophenol in acting as a free radical chain stopper is converted to the chlorocyclohexadienone which acts in turn as a metal scavenging agent.

The present invention is further illustrated by the following specific examples which illustrate the present invention and are not intended to limit the scope of the invention.

The chlorophenols of the present invention may be prepared by any of a variety of ways known in the art. For example, an ortho- or para-chlorophenol may be alkylated, or an alkylphenol may be chlorinated by known methods. One method is illustrated in the following example of the preparation of 1,1,3-tris - (4-hydroxy - 3-chloro-2-methyl-5-t-butylphenyl)butane.

Example 1

Sulfuryl chloride (24.9 g., 0.185 mole) was added slowly with good stirring at 53–56° to a solution of "Topanol CA" (Compound G in Table 1 hereinafter, 25.0 g., 0.0459 mole) in anhydrous benzene (55 ml.). The mixture was allowed to stand overnight at ambient temperature, warmed at approximately 50° C. for three hours, and concentrated at 5–10 mm. pressure on a rotary evaporator. The residual sirup was redissolved in dry benzene, and the concentration was repeated. A benzene solution of the residue was then extracted thoroughly with 3 N sodium carbonate solution, dried with Drierite, and evaporated in vacuo to give a pale yellow, solid residue, whose NMR spectrum indicated the absence of nuclear hydrogens ortho to the hydroxyl functions. Elemental analysis showed that the chlorine content of the material was about 14.0%, which corresponds to approximately 2.5 atoms of chlorine per molecule. In view of the analytical data, the spectroscopic evidence, and the results of similar reactions using other phenols as starting materials, the major constituent of the chlorinated product is identified as compound M in Table II hereinafter.

To further illustrate the present invention, a number of alkylphenols and a meta-chlorinated phenol were compared with various chlorophenols of the present invention with regard to their antioxidant properties. The screening procedure used was a simple oxygen uptake test allowing for volumetric measurement of the amount of oxygen absorbed by the system as a function of time. The time elapsing prior to the onset of rapid (autocatalytic) oxidation is designated as the "induction period." In most cases no oxygen was adsorbed during this period, while with a few inhibitors the occurrence of a slow, continuous absorption of oxygen (either immediately or at a later stage) either eliminated the induction period entirely or made its precise measurement difficult. The phenols used for comparison are structurally set forth in Table I. The chlorophenols of the present invention are set forth in Table II. In Tables III and IV induction periods from replicate experiments using the phenols used for comparison or the chlorophenols of the present invention, respectively, are either averaged or listed separately, depending on whether or not definite measurement of the induction period was possible.

TABLE I

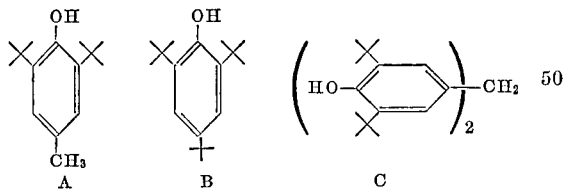

TABLE II

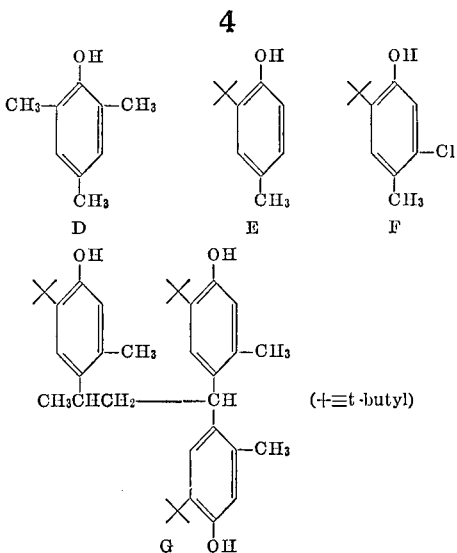

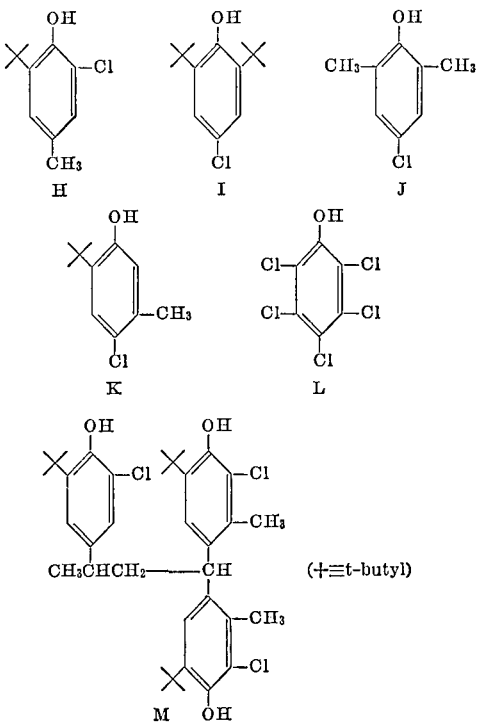

TABLE III.—INHIBITED AUTOXIDATIONS OF 4-VINYLCYCLOHEXENE (VCH) AND CUMENE [a]

| Substrate | Vol. percent in phH | Metal [b] | G-atom×10[7] | t-BuOOH (moles×10[4]) | Phenol | Moles×10[5] | Induction period, hr. | Percent oxidation during induction period [c] |
|---|---|---|---|---|---|---|---|---|
| VCH | 65 | Co | 4.0 | 5.27 | A | 9.08 | [d] 0.6±0.03 | 0 |
| VCH | 82 | Co | 2.0 | 2.64 | A | 2.27 | [e] 0.2±0.05 | 0 |
| VCH | 82 | Mn | 2.2 | 2.64 | A | 2.27 | 2.5–4.3 | 0 |
| VCH | 81 | Mn | 4.4 | 2.64 | A | 2.27 | 0.4–0.7 | 0 |
| Cumene | 82 | Co | 2.0 | 2.64 | A | 2.27 | [d] 0.2±0.1 | 0 |
| Cumene | 82 | Mn | 2.2 | 2.64 | A | 2.27 | [f] 0.6±0.1 | 0 |
| VCH | 65 | Co | 4.0 | 5.27 | B | 9.08 | 0.7–1.0 | 0 |
| Cumene | 82 | Co | 2.0 | 2.64 | B | 2.27 | <0.4 | 0 |
| Cumene | 82 | Co | 2.0 | 2.64 | C | 2.27 | 0.5–1.1 | 0 |
| Cumene | 82 | Co | 2.0 | 2.64 | D | 2.27 | <0.3 | 0 |
| Cumene | 82 | Co | 2.0 | 2.64 | E | 2.30 | [f] 0.35±0.05 | 0 |
| VCH | 82 | Co | 2.0 | 2.64 | F | 2.27 | 0.8–1.3 | 0 |
| VCH | 81 | Mn | 4.4 | 2.64 | F | 2.27 | [f] 0.75±0.25 | 0 |
| VCH | 82 | Co | 2.0 | 2.64 | G | 0.757 | 0.1–0.3 | 0 |

[a] 50° C., pure O$_2$ at 1 atm. total pressure (including vapor pressure of reaction mixture).
[b] Cobalt or manganese naphthenate.
[c] Assuming all O$_2$ absorbed was converted to hydroperoxide or peroxide.
[d] Average of six runs.
[e] Average of three runs.
[f] Average of two runs.

TABLE IV.—INHIBITED AUTOXIDATIONS OF 4-VINYLCYCLOHEXENE (VCH) AND CUMENE [a]

| Substrate | Vol. percent in phH | Metal [b] | G-atom×10⁷ | t-BuOOH (moles×10⁴) | Phenol | Moles×10⁵ | Induction period, hr. | Percent oxidation during induction period [c] |
|---|---|---|---|---|---|---|---|---|
| VCH | 65 | Co | 4.0 | 5.27 | H | 9.80 | >19.4 | 0. |
| Cumene | 82 | Co | 2.0 | 2.64 | H | 2.27 | >23.7 | 0.1. |
| Cumene | 82 | Mn | 2.2 | 2.64 | H | 2.27 | >21.7 | 0. |
| Cumene | 82 | Co | 2.0 | 2.64 | I | 2.31 | [d] >71.0, >18.2 | 0. |
| Cumene | 82 | Mn | 2.2 | 2.04 | I | 2.31 | >19.8 | 0. |
| Cumene | 82 | Co | 2.0 | 2.64 | J | 2.25 | >20.5, >19.8 | 0. |
| Cumene | 82 | Mn | 2.2 | 2.64 | J | 2.25 | >69.8 | 0. |
| VCH | 82 | Co | 2.0 | 2.64 | K | 2.27 | [e] >7.7, [e] >7.3 | 0.2 at 23.2 hr., 0.9 at 54.4 hr. |
| VCH | 81 | Mn | 4.4 | 2.64 | K | 2.27 | [e] >8.0, [e] >4.5 | 0.2 at 23.1 hr., 1.3 at 68.0 hr. |
| Cumene | 82 | Co | 2.0 | 2.64 | K | 2.27 | >22.5, >17.2 | 0. |
| Cumene | 82 | Co | 2.0 | 2.64 | L | 2.29 | >22.7 | 0. |
| VCH | 82 | Co | 2.0 | 2.64 | M | [f] 0.75±0.01 | ([e]) | 0.3 at 3.7 hr., 1.0 at 19.9 hr |

[a] 50° C., pure O₂ at 1 atm. total pressure (including vapor pressure of reaction mixture).
[b] Cobalt or manganese naphthenate.
[c] Assuming all O₂ absorbed was converted to hydroperoxide or peroxide.
[d] Values in the range of 9–16 hr. were obtained using a different sample of I.
[e] Difficult to determine exactly due to very slow onset of oxidation.
[f] Assuming compound M contains 2.5–3.0 Cl atoms.

Table IV shows that the chlorophenols of the present invention are outstandingly effective as antioxidants for preventing the autoxidation of cobalt and manganese catalyzed autoxidation of hydrocarbons. The ability of the chlorophenols of the present invention to inhibit cobalt or manganese catalyzed autoxidation is indicative of the outstanding inhibition properties of these phenols, since it is known that cobalt and manganese are the most active metal catalyst for autoxidation. Therefore, the chlorophenols of the present invention should be even more effective in the presence of other metals.

The nature of the objects of the present invention having been completely described and illustrated, what we wish to claim as new and useful and secured by Letters Patent is:

1. A method for reducing autoxidation initiated by a metal which acts as an autoxidation catalyst of hydrocarbon substrates at less than 50° C. which comprises: adding to said autoxidizable organic substrate containing metal ions which act as autoxidation catalyst at least a stoichiometric amount equal to the amount of metal ions present a chlorinated phenol having one or more atoms of chlorine in the positions ortho and/or para to the hydroxyl group.

2. A method according to claim 1 wherein said substrate contains a metal ion selected from the group consisting of titanium, vanadium, chromium, manganese, iron, cobalt, nickel, copper, molybdenum, tungsten and lead.

3. A method according to claim 1 wherein said substrate is an olefinic hydrocarbon.

4. A method according to claim 1 wherein said substrate is an alkylaromatic hydrocarbon.

References Cited

UNITED STATES PATENTS

| | | | |
|---|---|---|---|
| 2,388,041 | 10/1945 | Craig | 203—9 |
| 2,469,469 | 4/1949 | Kluge et al. | 252—54 |
| 2,560,044 | 7/1951 | Albert | 260—224 X |
| 3,459,654 | 8/1969 | Foroulis | 208—47 |
| 2,449,010 | 9/1948 | Robey et al. | 260—666.5 |
| 2,526,963 | 10/1950 | Morris | 203—6 X |
| 3,102,798 | 9/1963 | Orloff | 44—76 |

DELBERT E. GANTZ, Primary Examiner

G. E. SCHMITKONS, Assistant Examiner

U.S. Cl. X.R.

208—47, 48; 252—404; 260—624